(12) United States Patent
Keyes et al.

(10) Patent No.: US 6,456,983 B1
(45) Date of Patent: Sep. 24, 2002

(54) METHOD FOR MANAGING DISPOSITION OF DELINQUENT ACCOUNTS

(75) Inventors: Tim Kerry Keyes, West Redding, CT (US); Henry Fred Ander, Chandler, AZ (US); John Deaver Deets, Lawrenceville, GA (US); Donna Raye Shorten, Southport, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/470,734

(22) Filed: Dec. 23, 1999

(51) Int. Cl.$^7$ .............................................. G06F 17/60
(52) U.S. Cl. ......................................... 705/36; 705/40
(58) Field of Search ............................. 705/36, 38, 34, 705/40, 35

(56) References Cited

U.S. PATENT DOCUMENTS 6,098,052 A * 8/2000 Kosiba et al. ................ 705/40
6,202,053 B1 * 3/2001 Christiansen et al. ......... 705/38

FOREIGN PATENT DOCUMENTS

WO    WO 0184346 A2 * 11/2001 ................... 705/30

OTHER PUBLICATIONS

New Plan To Buy Out BPA's Debt to Cut Deficit, Minimize Rate Impact, Jun. 1994, Electric Utility Week, p. 6.*
Madhav Srinivasan, Applying the Economic Profit Concept in Pricing a Target, Jul./Aug. 1997, Investment Dealers Digest, v32n1.*
Karen Sibayan et al., C–BASS Launches Revolutionary Tool, Provides Investors With Loan–Level Data, Jan. 2002, Securities Data Publishing.*

(List continued on next page.)

*Primary Examiner*—Kenneth R. Rice
*Assistant Examiner*—Lynda Jasmin
(74) *Attorney, Agent, or Firm*—David C. Goldman; Jill M. Breedlove

(57) ABSTRACT

A system and method for evaluating an offer which has been made in relation to certain delinquent accounts is disclosed. A historical database of sorts is maintained on accounts which were previously characterized as delinquent. Payment history information is also retained on each of these historical delinquent accounts. These historical delinquent accounts are scored, and thereafter placed into a plurality of groups, with the high and low scores of these groups defining an associated score cluster or range of scores. A liquidation profile is established for each portion of the historical delinquent accounts defined by the application of the noted score clusters thereto (i.e., each collection of delinquent accounts defined by a particular score cluster has its own liquidation profile). Liquidation profiles are representative of how historical delinquent accounts defined by a particular score cluster recovered over time (i.e., representative of the payment stream of each historical delinquent account defined by a particular score cluster). When an offer is made in relation to accounts which are currently delinquent (not a historical delinquent account), each of these current delinquent accounts is scored and then separated into a plurality of groups using the score clusters which were identified when defining the plurality of groups of the historical portfolio. The net present value of each portion of the current portfolio defined by the application of the score clusters thereto is determined using the liquidation profile of its corresponding group of historical delinquent accounts (i.e., those defined by the same score cluster), using the outstanding balance information on each of these current delinquent accounts within the subject score cluster, and making normal assumptions regarding net present value determinations. This net present value may then be compared with an outstanding offer on a group-by-group basis.

7 Claims, 6 Drawing Sheets

OTHER PUBLICATIONS

George Overstreet et al. "Managerial Control in Credit Scoring Systems" Journal of Retail Banking, vol. VIII, Nos. 1 and 2, Spring–Summer 1986.*

Mike Connors, "Credit Scoring" , Business Credit, Apr. 1988.*

Punch Linda "A Sobering Year for Collectors" Credit Card Management, v5n3, pp. 52–56, Jun. 1992.*

Makuch et al. "Managing Consumer Credit Delinquency in the US Economy: A Multi–Billion Dollar Management Science Application" Interfaces 22, pp. 90–109, Jan.–Feb. 1992.*

Robins Gary "Retailers Are Finding New Uses for the Technique" Journal Article, v74n3, pp. 45 Mar. 1992.*

Phillips Business Information Inc. "Expanded Scoring May Predict More About Account Performance" Credit Risk Management Report, v1n19, Sep. 1991.*

Phillips Business Information Inc. "Recession Changes Customer Payment Patterns" Credit Risk Management Report, v2n18, Aug. 1992.*

Lisa Fickenscher, "Predicting Bankruptcy Risk" American Banker, v158n190, pp. 12, Oct. 1993.*

James J. Heckman, "The Common Structure of Statistical Models of Truncation, Sample Selection and Limited Dependent Variables and a Simple Estimator for Such Models", Anals of Economic and Social Measurement, 5/4.

* cited by examiner

FIG. 3

| Score Range | | Avg Score | Total Accts | Total Balance |
|---|---|---|---|---|
| Low | High | | | |
| 0.000 | 2.899 | 2.000 | 10555 | 8,243,227 |
| 2.899 | 3.934 | 3.442 | 10555 | 7,462,201 |
| 3.934 | 4.768 | 4.361 | 10556 | 7,727,997 |
| 4.768 | 5.529 | 5.150 | 10556 | 7,966,140 |
| 5.530 | 6.289 | 5.909 | 10556 | 8,179,809 |
| 6.289 | 7.055 | 6.670 | 10556 | 8,358,777 |
| 7.055 | 7.847 | 7.445 | 10556 | 8,508,875 |
| 7.847 | 8.676 | 8.257 | 10556 | 8,610,893 |
| 8.676 | 9.590 | 9.131 | 10555 | 8,923,303 |
| 9.590 | 10.593 | 10.084 | 10555 | 9,116,257 |
| 10.593 | 11.713 | 11.133 | 10556 | 9,256,629 |
| 11.713 | 13.003 | 12.345 | 10555 | 9,641,317 |
| 13.003 | 14.498 | 13.734 | 10556 | 9,766,437 |
| 14.498 | 16.296 | 15.370 | 10555 | 10,136,966 |
| 16.296 | 18.507 | 17.365 | 10555 | 10,444,386 |
| 18.507 | 21.403 | 19.896 | 10556 | 10,914,118 |
| 21.403 | 25.365 | 23.267 | 10555 | 11,267,901 |
| 25.365 | 31.591 | 28.237 | 10556 | 12,035,312 |
| 31.592 | 43.669 | 36.753 | 10555 | 12,768,081 |
| 43.670 | 347.470 | 65.372 | 10555 | 14,103,014 |
| | | | 211,109 | 193,431,641 |

US 6,456,983 B1

METHOD FOR MANAGING DISPOSITION OF DELINQUENT ACCOUNTS

FIELD OF THE INVENTION

The present invention generally relates to the field of managing the disposition of delinquent accounts (i.e., bad debt) and, more particularly evaluating a collection of delinquent accounts by subdividing this collection into a plurality of groups and making the disposition decision on a group-by-group basis.

BACKGROUND OF THE INVENTION

Significant amounts of credit are being extended to consumers each year in the form of the issuance of credit or other types of charge cards. One significant problem with the extension of credit is delinquency in the payment on accrued balances. A number of courses of action are typically employed for delinquent credit or other charge card accounts. Delinquent accounts may be sent to a collection agency where the creditor of the delinquent account will typically receive a percentage of the amount ultimately collected by the collection agency. Another avenue which may be pursued by a creditor of a delinquent account is to sell the delinquent account to a third party for a stated price who will then attempt to collect on the delinquent account. Typically a creditor will receive a bid for the sale of all delinquent accounts within a certain category or the like. For instance, a creditor may receive a bid for all delinquent charge accounts within a certain industry or group of industries. A creditor may also receive a bid for all delinquent charge accounts which were issued by a common entity or group of entities.

One way in which bids of the above-described type have been previously evaluated is to refer back to a historical database which contains information about payments which were received on accounts after they became delinquent. Information is retained on how each particular delinquent charge account recovered, or stated another way the payment profile of these delinquent accounts (i.e., the amount and timing of payments after the accounts are "declared" delinquent). This historical information is used as follows and may be illustrated by an example where a bid has been made to purchase all current delinquent accounts issued by Company "A". A single liquidation or payment profile is generated from all of the historical data which has been retained on the delinquent accounts issued by Company "A" in relation to their recovery. From this single liquidation profile and based upon certain other assumptions in relation to the currently delinquent accounts for which a bid has been received, the average net present value of the plurality of currently delinquent accounts for which a bid has been received is calculated. The bid price is compared to this net present value, and the decision is made as to whether the bid should be accepted.

BRIEF SUMMARY OF THE INVENTION

One problem with the above approach is that there may be significant variance of sorts within all of the currently delinquent accounts for which a bid has been received. Some of these currently delinquent accounts may be desirable to sell for the subject bid price, while others may be desirable to retain in some manner (e.g., to continue to hold and receive payments thereon, to send to collections). Thus, there is a need for a system and method which makes disposition decisions based upon splitting a predefined collection of delinquent accounts into a plurality of groups for independent analysis, and thereafter deciding how to deal with these delinquent accounts on a group-by-group basis.

This disclosure generally relates to managing the disposition of delinquent accounts or the like. For instance, this disclosure allows for a determination as to whether certain delinquent credit card accounts should be sold for an offered price, or whether at least some should be retained in some manner for collections by a third-party collection agency or an "internal" collection agency.

One aspect of this disclosure relates to managing a collection of currently delinquent accounts, such as by making a recommendation for disposition of such delinquent accounts. As such, this "collection" will hereafter be referred to as a "current portfolio," and its respective delinquent accounts will hereafter be referred to as "current delinquent accounts." Broadly stated, the current portfolio is divided up into a plurality of groups. Each of these groups is then independently analyzed to make a value determination on a group-by-group basis. For instance, the "value determination" may be at least reflective of an average amount which an issuer of the delinquent account may expect to receive in relation to each delinquent account within a particular group. Based on this evaluation, each of the groups may be dispositioned in at least some manner (i.e., all delinquent accounts within a particular group are dispositioned in the same manner). Representative "dispositions" include selling all delinquent accounts within a particular group for an agreed-upon price, as well as retaining all delinquent accounts within a particular group to collect in some manner on future payments made in relation thereto. Payments may be received in a variety of manners. For instance, the issuer could just wait for the holder of the delinquent account to make payments directly to the issuer of the delinquent account. More commonly the issuer of the delinquent account will transfer the particular current delinquent accounts to collections, where the issuer will only receive a percentage of the payments made by each holder of each current delinquent account. "Collections" may be affected externally (i.e., by a party which is not affiliated with the issuer of the delinquent account, or stated another way by a third-party collection agency) or internally (by an entity of sorts which is affiliated with the issuer of the delinquent account, such as a department or division of a company which is responsible for collections).

Various refinements exist of the features noted in relation to this disclosure. Further features may also be incorporated in this disclosure as well. These refinements and additional features may exist individually or in any combination. Each delinquent account may be "scored", and the "score" of a particular current delinquent account may be reflective of a payment which would be projected to be received in relation to this particular delinquent account, based upon a statistical analysis of sorts. These "scores" may be used to assign each of the current delinquent accounts to one of the plurality of groups, with each group having its own score range.

Historical data may be retained on accounts which were at least at one time "delinquent", and for which at least certain payments have been made in relation thereto. These previously delinquent charges will hereafter be referred to as "historical delinquent accounts," and a collection of these historical delinquent accounts will hereafter be referred to as a "historical portfolio." This historical data may be used in the dispositioning decision in relation to each group of current delinquent accounts. In this regard, the historical portfolio may be divided up into a plurality of groups. One way to define the plurality of groups is to score each of the historical delinquent accounts in the above-described manner, to divide this historical portfolio up into a plurality of groups (e.g., a predetermined number of groups), and to note the high and low score in each group of the historical portfolio to define a plurality of score ranges or clusters. These same score ranges or clusters may then be used to establish the above-noted groupings for the current portfolio.

Further refinements may be used to define the groups based upon the above-noted scoring. Groupings may be established by requesting that there be a certain number of score groups within each of the historical portfolios, and that there be an equal number of delinquent accounts in each of the score groups of the historical portfolio. Once the groupings are established in this manner, the minimum and maximum score in each group of the historical portfolio may be noted to define the score range for each such group. Identification of the group with which a particular current delinquent account should be associated may then entail scoring such current delinquent account, and then associating such current delinquent charge account with a group of other current delinquent accounts which also have a score within a score range associated with the group.

Each of the groups of the historical portfolio may have a liquidation profile associated therewith. This liquidation profile may be based upon amounts (i.e., monetary payments) which were actually received by the issuer in relation to each of the historical delinquent accounts over a certain period of time (e.g., payments received via sending the historical delinquent accounts to collections). The liquidation profile for a particular group in the historical portfolio would thereby be the average for all of the historical delinquent accounts within the subject group. In the event that a bid has been received for the current delinquent accounts, these liquidation profiles of the groups within the historical portfolio may be used to establish the net present value which may be associated with each particular group of the current delinquent portfolio for comparison with the bid price. If the average net present value of the current delinquent charge accounts within a particular group exceeds the bid price, the prudent disposition decision would be for the current delinquent accounts within this particular group to be retained by the issuer for receipt of payments in relation thereto in the manner which was used to define the subject liquidation profile. Conversely, if the bid price exceeds the net present value of the current delinquent accounts within a particular group, the prudent disposition decision would be for the current delinquent accounts within the particular group to be sold for the bid price. It should be appreciated that the noted liquidation profiles may be used to make the disposition decision regardless of the format of the "bid" which has been received (i.e., the liquidation profile may be defined via using third party collection agencies, and the "bid" may be the amount which would be expected to be received using an internal collection agency).

Common practice in the debt management industry is for a third party to offer to purchase a certain type of current delinquent accounts, such as all current delinquent accounts having a common issuer or within a common field or industry. The present invention may be used to determine which, if any, of the current delinquent accounts should be sold, and which, if any, of the current delinquent accounts which are the subject of the bid should be retained to collect in some manner upon future monetary payments made in relation thereto. For instance, the disposition decision may be to sell all delinquent accounts having a score less than a certain amount, and to retain all other delinquent accounts for receipt of payments made in relation thereto.

BRIEF DESCRIPTION OF THE DRAWINGS

FIG. 3 is a chart of score clusters from exemplary data of delinquent accounts and as defined by the module of FIG. 2.

DETAILED DESCRIPTION OF THE INVENTION

This disclosure will be described in relation to the accompanying drawings which assist in illustrating its various pertinent features. Generally this disclosure is directed to a system and method for making a recommendation as to how to disposition accounts or the like (e.g., credit card accounts) which have become delinquent or where the holder of the account is not making payment in accordance with the agreement between the holder of the account (i.e., debtor) and the issuer of the account (i.e., creditor). Any standard may be employed for characterizing an account as "delinquent" for purposes of this disclosure. Moreover, this disclosure is applicable for use not only by issuers as defined above, but by entities which manage the credit accounts on behalf of one or more issuers. This would include credit card service businesses, which will also be encompassed by the term "issuer" herein.

Figure 1:
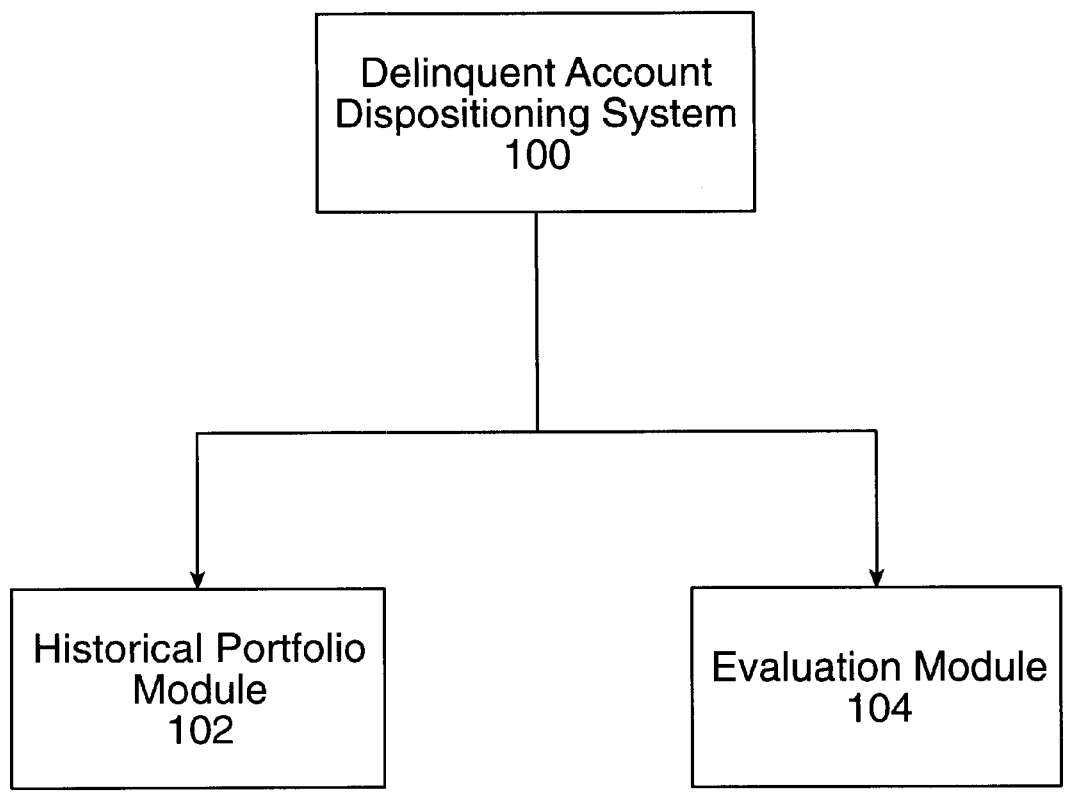
FIG. 1 presents one embodiment of a bad or delinquent account disposition system/method in accordance with principles of this disclosure.

One embodiment of a system which affects the above-noted recommendation function is presented in FIG. 1 in the form of a bad or delinquent account dispositioning system 100. Any type of implementation may be used for the delinquent account dispositioning system 100. However, the preferred implementation would be to include the delinquent account dispositioning system 100 on any type of appropriate computer (e.g., desktop computer) which has any appropriate type of computer-readable storage medium. There are two main components of the delinquent account dispositioning system 100. One of these main components is a historical portfolio module 102 which uses information or data which has been retained on accounts which were at one time delinquent, and for which payment information has been retained on payments which were received from the account holder after the account was declared delinquent. Multiple functions are provided by the historical portfolio module 102. First, the historical portfolio module 102 retrieves an appropriate collection of historical data based upon an analysis to be conducted on certain currently delinquent accounts. From this retrieved collection of historical data, the historical portfolio module 102 identifies a basis for dividing the retrieved collection of historical data into a plurality of groups. Information is then obtained/generated by the historical portfolio module 102 on the payment history for each of these individual groups. All of this information is then used by another component of the delinquent account dispositioning system 100, namely the evaluation module 104, to process this information and thereafter make a recommendation on the disposition of the currently delinquent accounts being analyzed. Although the delinquent account dispositioning system 100 is being characterized herein as having a separate historical portfolio module 102 and evaluation module 104, various other implementations may be used to execute the functions to be described herein.

Figure 2:
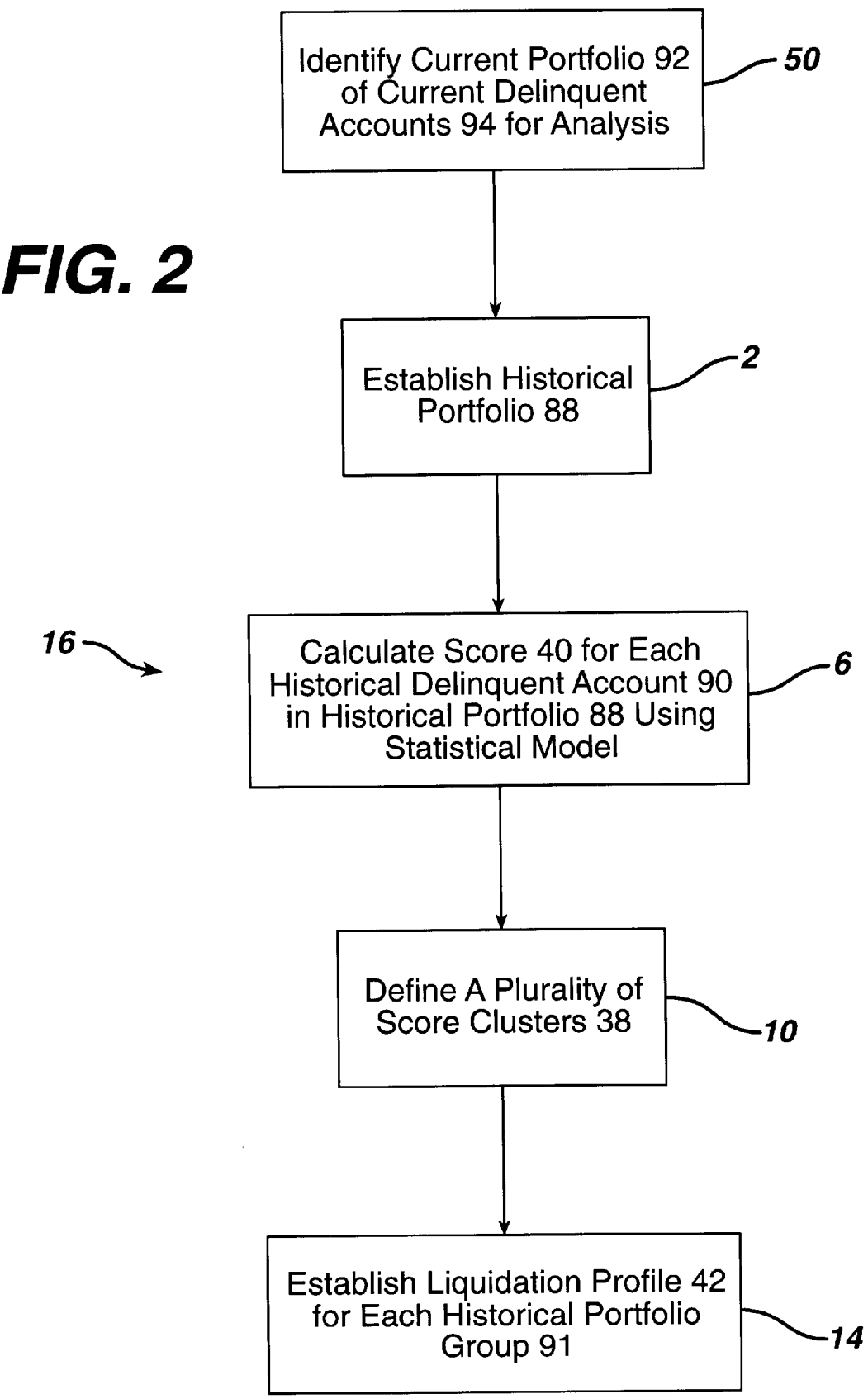
FIG. 2 is a flow chart which illustrates one embodiment of a module which may be used by the system of FIG. 1 for establishing a plurality of score clusters or ranges of scores from historical delinquent accounts.

One embodiment of a protocol of sorts which may be used by the historical portfolio module 102 of FIG. 1 is presented in FIG. 2 in the form of a historical portfolio subroutine 16. The historical portfolio subroutine 16 includes an action 2, which is directed toward establishing a historical portfolio 88. Information in the historical portfolio 88 and the definition thereof is based upon a plurality of predetermined historical delinquent accounts 90. Historical delinquent accounts 90 are accounts which were at one time characterized as being delinquent, and for which at least the payment history on such accounts has been retained for use by the delinquent account dispositioning system 100.

Various alternatives may be employed in relation to the historical portfolio 88 established by execution of action 2 of the historical portfolio subroutine 16 of FIG. 2. Appropriate data on historical delinquent accounts 90 may be retained by an operator/user of the delinquent account dispositioning system 100 from only a single issuer, from multiple issuers, within a single industry, from multiple industries, within a single market segment, from multiple market segments, or on any other basis. Action 2 of the historical portfolio subroutine 16 may be configured to allow the user/operator of the delinquent account dispositioning system 100 to use the data which has been retained on all historical delinquent accounts 90 or any selected portion thereof. In this regard, FIG. 2 reflects that the historical portfolio subroutine 16 may include/utilize an action 50 which involves an identification of a current portfolio 92 which is in turn is defined by a plurality of current delinquent accounts 94. The current portfolio 92 are those current delinquent accounts for which at least some type of analysis is desired. Identification of the current portfolio 92 will typically be based upon the receipt of an offer of sorts in relation to the plurality of current delinquent accounts 94, which define the current portfolio 92. Parameters which define the current portfolio 92 preferably are also used to define the historical portfolio 88 established by action 2 of the historical profile subroutine 16. For instance, if an offer has been made to purchase all of the current delinquent accounts 94 from Issuer A (e.g., a certain retailer), the historical portfolio 88 established by action 2 of the historical portfolio subroutine 16 will preferably include only those historical delinquent accounts 90 which are also from Issuer A (even though historical delinquent accounts 90 from other issuers are available). Notwithstanding the benefit of establishing the historical portfolio 88 in this manner, other ways may be utilized as well.

Another action of the historical portfolio subroutine 16 is an action 6 which is directed toward calculating a score 40 for each historical delinquent account 90 within the historical portfolio 88 established by action 2 of the historical portfolio subroutine 16. Generally, this "scoring" is directed to calculating or deriving a "number" which is at least reflective of the payment which would be expected to be received on the subject historical delinquent account 90 based upon certain assumptions. Statistical analysis principles may be employed, taking into consideration such factors as the locale of the account holder, the outstanding balance on the subject delinquent account, the lapse of time from the last payment made on the subject delinquent account, how long the subject delinquent account has been in existence, and other relevant factors. Scoring is done at the time that the subject historical delinquent account 90 is originally declared delinquent and whenever the historical portfolio 88 is "rebuilt" or when "maintenance" is performed in relation thereto as will be discussed in more detail below (e.g., when new historical delinquent accounts 90 are added to the historical portfolio 88, when new score clusters 38 are established as will be discussed below). These scores are retained and may be stored in an appropriate database for access by the delinquent account dispositioning system 100.

One appropriate statistical model for calculating a score 40 is as follows: Score 40="Probability 1"×"Probability 2", where Probability 1 is the probability of an account holder being a payor (e.g., being one that is likely to make payments on a delinquent account), and where Probability 2 is, assuming that the subject account holder is a payor, the estimated portion of the balance on the subject delinquent account which will be paid over some predetermined time period. Probability 1 may involve a logistic regression (either a "1" for a "payor" or a "0" if a "non-payor"), while Probability 2 may be a multiple linear regression. The basics of a generic statistical model which may be adapted for purposes of the delinquent account dispositioning system 100 are presented in Heckman, "The Common Structure of Statistical Models of Truncation, Sample Selection, and Limited Dependent Variables and a Simple Estimator for Such Models," *Annals of Economic and Social Measurement,* pages 475–492 (1976), the entire disclosure of which is hereby incorporated by reference in its entirety herein. Other types of statistical models may be appropriate for calculating the score 40 for each of the historical delinquent accounts 90 in the historical portfolio 90 established by action 2 of the historical profile subroutine 16.

Each historical delinquent account 90 within the historical portfolio 88 established by action 2 of the historical profile subroutine 16 of FIG. 2 thereby has a score 40 (e.g., a number) associated therewith. Thereafter and as reflected by an action 10 of the subroutine 16, a plurality of score clusters 38 are defined, with each score cluster 38 including a certain range of scores 40. One way to establish these score clusters 38 is to identify how many score clusters 38 are desired, and to then have the subroutine 16 place preferably an equal number of historical delinquent accounts 90 from the historical portfolio 88 established by action 2 in a plurality of historical portfolio groups 91. The number of historical portfolio groups 91 will be equal to the above-noted predetermined number of score clusters 38 which was desired. The score clusters 38 are thereby then defined by the high score 40 and low score 40 in each of the various historical portfolio groups 91. This is the technique which was employed in the example presented by FIG. 3.

FIG. 3 represents that a determination was made to have twenty score clusters 38, as evidenced by the existence of twenty historical portfolio groups 91. Each of the historical portfolio groups 91 of FIG. 3 has a total accounts identifier 30 associated therewith which is reflective of the number of historical delinquent accounts 90 in the particular historical portfolio group 91. As can be seen by a review of FIG. 3, the variance of the total number of delinquent historical accounts 90 in each historical portfolio group 40 is only 1 (e.g., the statistical model attempted to put an equal number of historical delinquent accounts 90 in each historical portfolio group 91). Each historical portfolio group 91 presented in FIG. 3 also has a low score identifier 18 which corresponds with the lowest score 40 of any of the historical delinquent accounts 90 within the subject historical portfolio group 91. Similarly, each of the historical portfolio groups 91 presented in FIG. 3 has a high score identifier 22 which corresponds with the highest score 40 of any of the historical delinquent accounts 90 within the subject historical portfolio group 91. Each score cluster 38 is thereby defined by a range extending from the low score identifier 18 of its corresponding historical portfolio group 91 to its the high score identifier 22 of its corresponding historical portfolio group 91. An average score identifier 26 may be provided if desired for each of the historical portfolio groups 91, which would be the average score 40 of the various historical delinquent accounts 90 contained within the subject historical portfolio group 91. A balance identifier 34 is also associated each historical portfolio group 91, and is representative of the total amount which is owed by all of the historical delinquent accounts 90 within the subject historical portfolio group 91.

Figure 4:
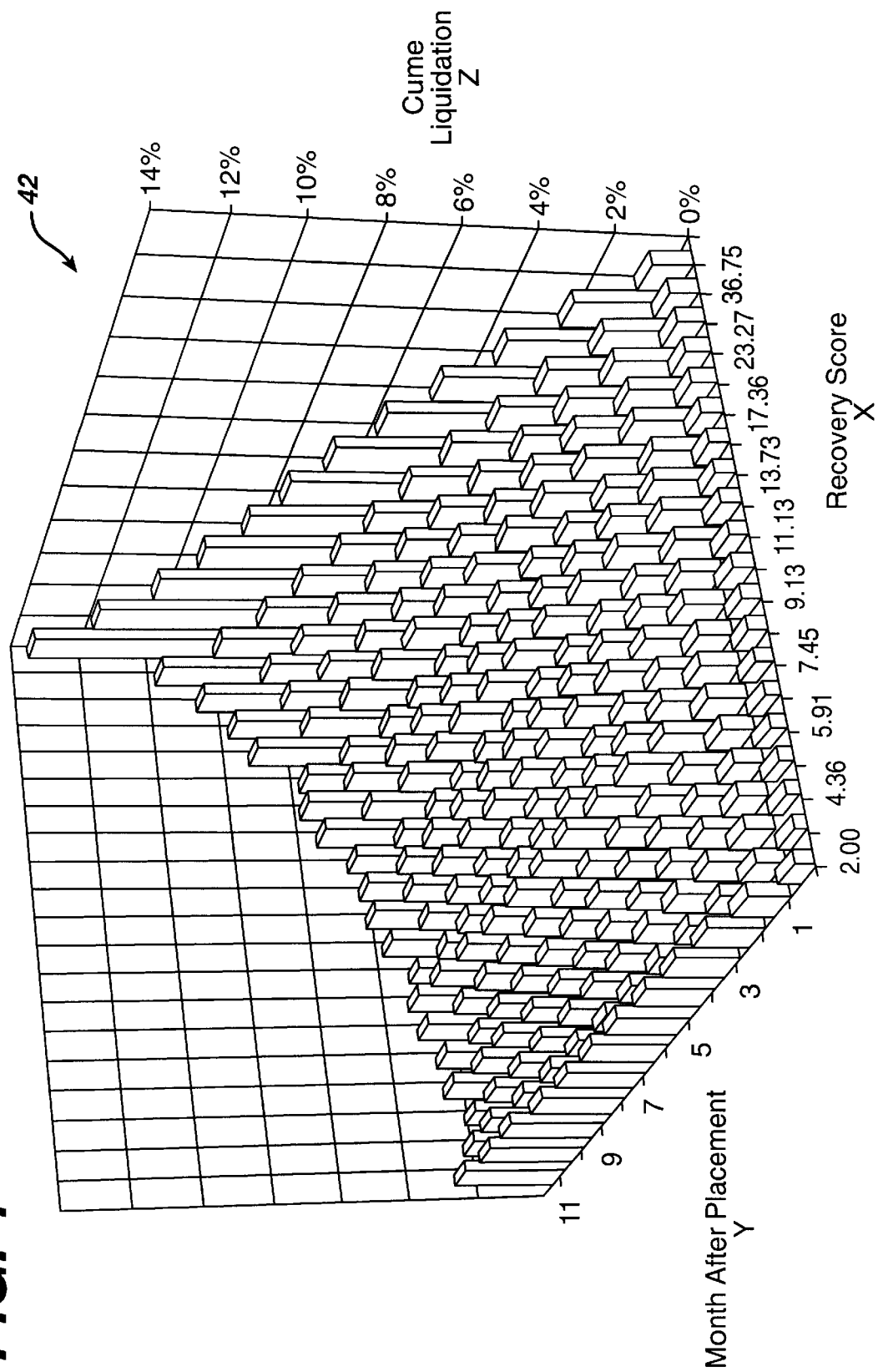
FIG. 4 is a perspective view which illustrates a liquidation profile for each of the score clusters presented in FIG. 3.

Another action or function which is undertaken through the historical portfolio subroutine 16 of FIG. 2 is the establishment of a liquidation profile 42 for each of the historical portfolio groups 91. Generally, the liquidation profile 42 for a given historical portfolio group 91 of the historical portfolio 88 is established by retaining data on payments made in relation to each historical delinquent account 90 within the subject historical portfolio group 91 over a predetermined period of time. FIG. 4 presents a liquidation profile 42 for each of the twenty historical portfolio groups 91 represented by the data presented in FIG. 3. The average values of the score clusters 38 corresponding with each of the historical portfolio groups 91 are plotted along the "x" axis, the months from being characterized as "delinquent" are plotted along the "y" axis, and a number representative of the total amount of payments received during a predetermined time period from each of the historical delinquent accounts 90 within each of the historical portfolio groups 91 is plotted along the "z" axis (e.g., a percentage of the outstanding balance which was received during the noted time period).

The liquidation profiles 42 referred to in action 14 of the historical portfolio subroutine 16 and illustrated in FIG. 4 are representative of how historical delinquent accounts 90 within a particular historical portfolio group 91 recovered over time, or more specifically how the payment streams differed over time for each of the historical portfolio groups 91. Various ways may be used to establish the liquidation profiles 42. For instance, the liquidation profiles 42 may be representative of amounts which were received from those historical delinquent accounts 90 within a particular historical portfolio group 91 by having previously sent such historical delinquent accounts 90 to a third-party collection agency or one which was "external" to the issuer of the subject delinquent accounts 90. This will likely be the most common scenario, although the liquidation profiles 42 need not be limited to this type of implementation. The liquidation profiles 42 could be based upon payments made directly from the holder of the subject historical delinquent accounts 90 to the issuer of such historical delinquent accounts 90, or could be based upon the use of an internal collection agency or one which was associated with the issuer of the historical delinquent accounts 90 at issue. Simply put, the liquidation profiles 42 are indicative of how the historical delinquent accounts 90 within a particular historical portfolio group 91 financially recovered on some common basis.

Another primary component of the delinquent account dispositioning system 100 presented in FIG. 1 is an evaluation module 104. The delinquent account dispositioning system 100 may be used to evaluate an "offer" which has been made on a current portfolio 92 defined by a plurality of delinquent accounts which are currently delinquent, or "current delinquent accounts 94" as noted above. Recommendations as to whether accept this offer or any portion thereof are made by the evaluation module 104.

Figure 5:
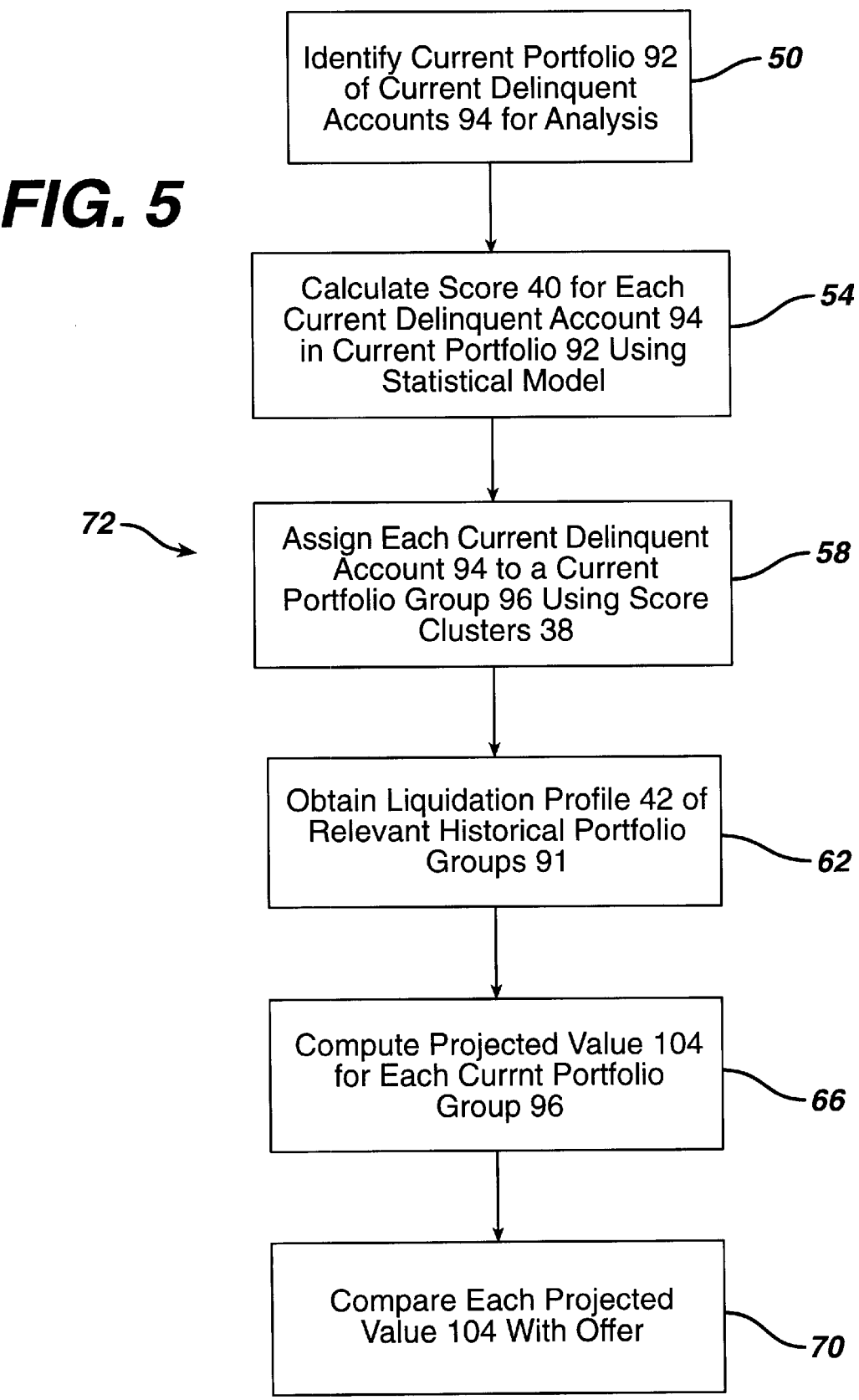
FIG. 5 is a flow chart which illustrates one embodiment of a module which may be used by the system of FIG. 1 for making a dispositioning decision on an offer of sorts which has been made on a collection of currently delinquent accounts.

One embodiment of a protocol which may be used to execute the above-noted type of evaluation is presented in the form of an evaluation subroutine 72 per FIG. 5. Initially it will be seen that the evaluation subroutine 72 utilizes/makes reference to the action 50 discussed above in relation to the historical portfolio subroutine 16. Generally, action 50 again is directed toward identifying a current portfolio 92 of current delinquent accounts 94 for analysis, and again which will most typically be based upon having received an offer in relation to such current portfolio 92 (e.g., the analysis need not be based upon the receipt of any offer, but could be to determine how to proactively pursue the disposition of certain current delinquent accounts 94). A score 40 is calculated for each of these current delinquent accounts 94 via action 54 of the evaluation subroutine 72, and generally in the same manner discussed above in relation to action 6 of the historical portfolio subroutine 16 of FIG. 2 (e.g., using a statistical model of the type discussed above). Like the scoring for the historical delinquent accounts 90 noted above, scoring for each of the current delinquent accounts 94 is done at the time that the subject current delinquent account 94 is originally declared delinquent, if the same is ever incorporated into the historical portfolio 88, or if the historical portfolio 88 is "rebuilt" or when "maintenance" is performed in relation thereto as will be discussed in more detail below (e.g., when new historical delinquent accounts 90 are added to the historical portfolio 88, when new score clusters 38 are established as will be discussed below). These scores 40 for the current delinquent accounts 94 are retained and may be stored in an appropriate database for access by the delinquent account dispositioning system 100.

The score clusters 38 defined by action 10 of the historical portfolio subroutine 16 are then applied to the current portfolio 92 to separate the plurality of current delinquent accounts 94 into a plurality of individual current portfolio groups 96. All current delinquent accounts 94 having a score 40 within a certain range of scores 40 (e.g., within a first score cluster 38) will be in one current portfolio group 96, while all current delinquent accounts 94 having a score 40 within a another certain range of scores 40 (e.g., within a second score cluster 38) will be in a different current portfolio group 96. This is reflected by action 58 of the evaluation subroutine 72 and may be illustrated by an example. For instance, if the score 40 of a particular current delinquent account 94 was "3.50", this particular current delinquent account 94 would be included in that group of the current portfolio 92 established by the application of score cluster 93 of FIG. 3 thereto. It should be appreciated that the score clusters 38 are individually and separately applied to each of the historical portfolio 88 and the current portfolio 92. Current delinquent accounts 94 defined a given score cluster 38 are not "intermingled" with historical delinquent accounts 90 within this same score cluster 38 for purposes of the analysis provided by the evaluation module 104.

Once all the current delinquent accounts 94 have been separated into their respective current portfolio groups 96, as defined by the plurality of score clusters 38 identified by action 10 of the subroutine 16 of FIG. 2, action 62 of the evaluation subroutine 72 of FIG. 5 indicates that the liquidation profiles 42 of the relevant historical portfolio groups 91 are obtained or retrieved. More specifically, a particular portfolio group 96 defined by its score cluster 38 will use the related liquidation profile 42 of the historical portfolio group 91 which shares a common score cluster 38, and so forth. Thereafter, action 66 of the evaluation subroutine 72 indicates that a projected value 104 is computed for each current portfolio group 96 using its corresponding liquidation profile 42 per the above (i.e., the liquidation profile of the historical portfolio group 91 which is defined by the same score cluster 38). For instance, for a particular portfolio group 94 defined by its score cluster 38, the projected value 104 may be the average net present value of all of the current delinquent accounts 94 within this particular current portfolio group 94, and which would be calculated using the related liquidation profile 42 of those historical delinquent accounts 90 which were defined by the historical profile group 91 having this same score cluster 38, as well as other factors/assumptions commonly employed to compute a net present value based upon knowledge of future payments.

Figure 6:
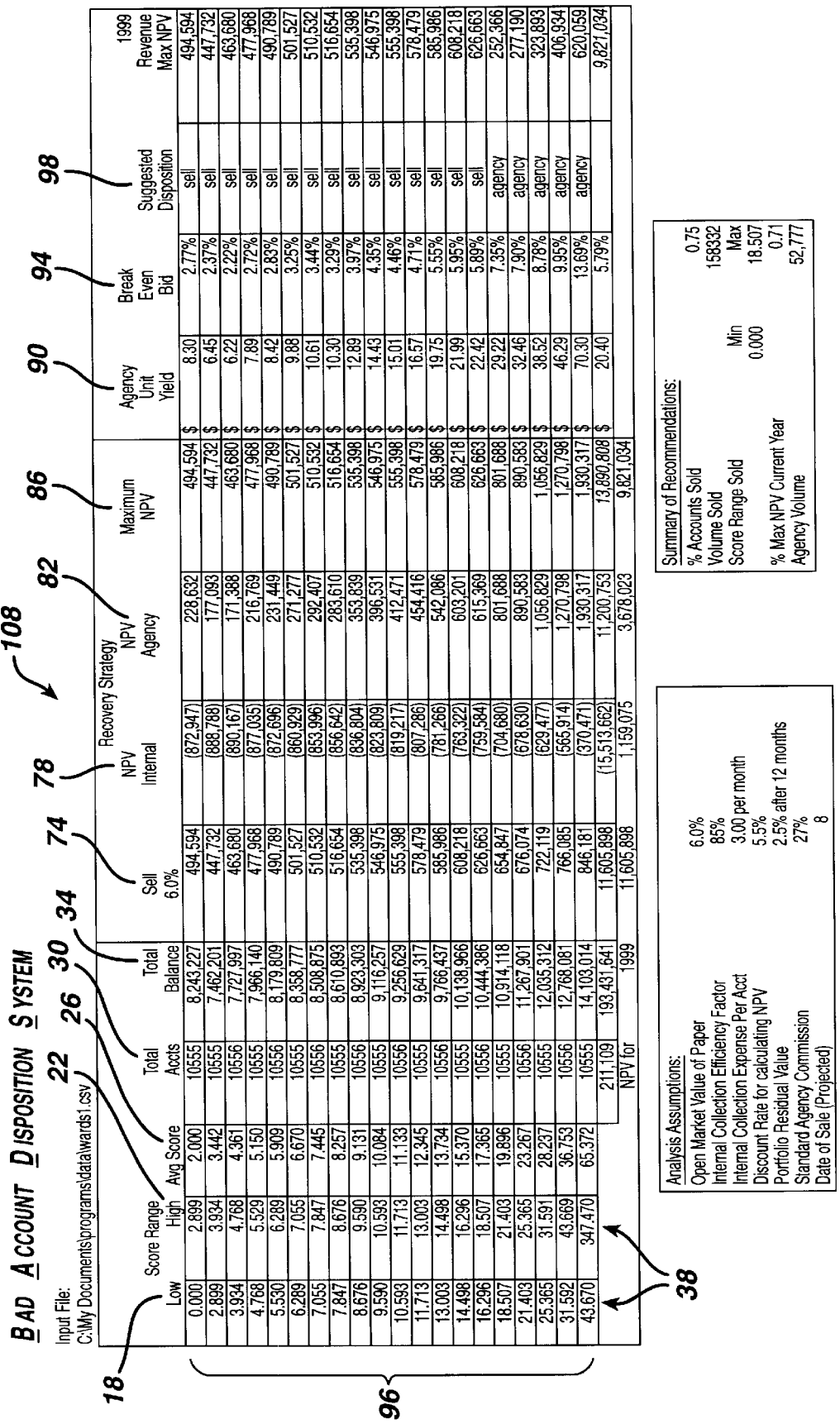
FIG. 6 is a chart of one embodiment of an output from the module of FIG. 5 on the representative data presented in FIG. 3.

Conclusion of the evaluation subroutine 72 is provided by an action 70 which is directed to comparing the projected value 106 from action 66 of each current portfolio group 96 with an offer which will commonly be associated with action 50. An "offer" associated with action 50 of the evaluation subroutine 72 of FIG. 5 may take various forms. For instance, the "offer" may be expressed as a percentage of the total outstanding debt of the current portfolio 92 (e.g., some entity may have offered to purchase the entirety of the current portfolio 92 for a stated price, commonly expressed as a percentage of the total debt associated with this portfolio 92). This is the situation presented by the report 108 of FIG. 6. Report 108 presents the application of each of the score clusters 38 identified in FIG. 3 to one embodiment of a current portfolio 92. It should be appreciated that the data being presented in FIG. 6 as the "current portfolio 92", is the same as that which was earlier presented in FIG. 3 as the "historical portfolio 88." This obviously will not typically be the case in practice.

Each current portfolio group 96 has: 1) a NPV-Sell identifier 74 associated therewith which is representative of a monetary amount which would be paid to an issuer of the delinquent accounts, and is derived for each current portfolio group 96 by multiplying its corresponding total balance identifier 34 by a predetermined percentage, which is the offer in this case (6% in the subject example); 2) a NPV-Agency identifier 82 which is the "result" of action 66 of the evaluation subroutine 72 of FIG. 5 (knowing the relevant liquidation profile 42 of the corresponding historical portfolio group 91, and knowing the outstanding balance identifier 34 of the subject current portfolio group 96, and making certain assumptions, a projected value 106 (e.g., an average to be associated with each current delinquent account 94 within the subject current portfolio group 96) may be derived); and 3) a NPV-Internal identifier 78 which is projection of a net present value if internal collections were used in relation to the subject current delinquent accounts 94. Various ways could be implemented for determining the NPV-Internal identifier 78. For instance, such could be determined in the same manner as the NPV-Agency identifier 82 through development of appropriate liquidation profiles. Moreover, the NPV-Internal identifiers 78 could be derived by assuming a particular collection percentage, as well as taking into account the cost associated with such collections.

Recommendations on the delinquent charge accounts 94 within each current portfolio group 96 is made by the delinquent account dispositioning system 100 through a comparison of the corresponding values of the NPV-Sell identifier 74, the NPV-Internal identifier 78, and the NPV-Agency identifier 82. Whichever is the largest is identified as a Maximum NPV identifier 86 for the respective current portfolio group 96, and further forms the basis for a Suggested Disposition identifier 98. For instance, if the NPV-Sell identifier 74 for a particular current portfolio group 96 is higher than its corresponding NPV-Internal and NPV-Agency identifiers 78, 82, the recommendation by the delinquent account dispositioning system 100 would be to accept the offer in relation to the current delinquent accounts 94 within this particular current portfolio group 96. Conversely, if the NPV-Agency identifier 82 for a particular current portfolio group 96 was higher than its corresponding NPV-Sell identifier 74 and NPV-Internal identifier 78, the corresponding suggested disposition decision 98 would be to decline the offer and to allow the current delinquent accounts 94 within this particular current portfolio group 96 to proceed to third-party collections.

Periodic maintenance of sorts may be required in relation to the delinquent account dispositioning system 100, namely for the above-noted statistical model. Over time the statistical model may degrade to the point where it would be desirable to define a new set of score clusters 38 using the protocol referenced above. This degradation may show up in the liquidation profiles 42 of the historical portfolio groups 91 in the form of peaks and valleys. Degradation of the statistical model also may be checked over time by identifying score clusters 38 in the above-noted manner, but for a current portfolio 92 having a relatively large number of corresponding current delinquent accounts 94. The score clusters 38 established through analysis of this current portfolio 92 may be checked against those score clusters 38 where have been defined through the historical portfolio 88. If there is more than an insignificant deviation, new score clusters 38 may be established in the above-noted manner for the historical portfolio 88 for use in the above-noted manner. Alternatively, the "original" score clusters 38 from the historical portfolio 88 could remain unchanged until another, later-in-time, identification of score clusters 38 from yet another current portfolio 92 also showed the same type of deviation.

Based upon the foregoing, it can be seen that the delinquent account dispositioning system 100 increases profitability in relation to how a current portfolio 92 should be handled in relation to recovering monies owed in relation thereto. The system 100 provides a basis for determining which current delinquent accounts 94 within the current portfolio 92 will likely yield a highest rate of return by sending the same to third-party collections, which current delinquent accounts 94 within the current portfolio 92 will likely yield a highest rate of return by sending the same to internal collections, and which current delinquent accounts 94 within the current portfolio 92 will likely yield a highest rate of return by accepting a third-party bid to purchase such current delinquent accounts 94 outright.

The foregoing description of this disclosure has been presented for purposes of illustration and description. Furthermore, the description is not intended to limit the disclosure to the form disclosed herein. Consequently, variations and modifications commensurate with the above teachings, and skill and knowledge of the relevant art, are within the scope of this disclosure. The embodiments described hereinabove are further intended to explain best modes known of practicing the disclosure and to enable others skilled in the art to utilize the disclosure in such, or other embodiments and with various modifications required by the particular application(s) or use(s) of this disclosure. It is intended that the appended claims be construed to include alternative embodiments to the extent permitted by the prior art.

What is claimed is:

1. A method for managing a current portfolio comprising a plurality of current delinquent charge accounts, comprising:

determining a score for each of the plurality of current delinquent charge accounts in the current portfolio;

defining a plurality of score clusters for the current portfolio, wherein each score cluster comprises a range of scores;

segmenting the plurality of current delinquent charge accounts of the current portfolio into the defined plurality of score clusters according to the determined score;

retrieving a liquidation profile established for each of the clusters of current delinquent charge accounts;

determining a net present value for each cluster of current delinquent charge accounts using the retrieved liquidation profile; and dispositioning each cluster of current delinquent charge accounts according to the determined net present value.

2. The method according to claim 1, wherein the determining of a score comprises using at least two probability factors.

3. The method according to claim 1, wherein the determining of a score comprises using a product of a logistic regression and a multiple linear regression.

4. The method according to claim 1, wherein the determining of a score is based upon at least one of an amount of time that a current delinquent charge account has been characterized as being delinquent, the length of time that a current delinquent charge account has been in existence including a time period wherein the account is characterized as non-delinquent, an amount owed to a current delinquent charge account, residence of an account holder of the current delinquent charge account, a creditor associated with the current delinquent charge account and a category in which the current delinquent charge account may be placed.

5. The method according to claim 1, wherein the retrieving of a liquidation profile comprises:

retaining a historical portfolio comprising a plurality of historical delinquent charge accounts and a payment record for each of the historical delinquent charge accounts;

determining a historical score for each of the plurality of historical delinquent charge accounts in the historical portfolio;

defining a plurality of historical score clusters for the historical portfolio, wherein each historical score cluster comprises a range of scores corresponding to the score clusters defined for the current portfolio;

segmenting the plurality of historical delinquent charge accounts of the historical portfolio into the defined plurality of score clusters; and establishing the liquidation profile for the historical delinquent charge accounts in each score cluster.

6. The method according to claim 1, wherein the dispositioning of a cluster of current delinquent charge accounts comprises comparing the net present value determined for the cluster with a bid price received for the current portfolio.

7. The method according to claim 1, wherein the dispositioning of a cluster of current delinquent charge accounts comprises at least one of selling the current delinquent charge accounts within the cluster, sending the current delinquent charge accounts within the cluster to a collection agency affiliated with a creditor of the current portfolio, and sending the current delinquent charge accounts within the cluster to an internal collection agency affiliated with the creditor.

* * * * *